US009085367B2

(12) United States Patent
Steinbeck

(10) Patent No.: US 9,085,367 B2
(45) Date of Patent: Jul. 21, 2015

(54) APPARATUS FOR MOVING AN OBJECT ON A RAIL

(75) Inventor: Herbert Steinbeck, Hamburg (DE)

(73) Assignee: Airbus Operations GmbH (DE)

( * ) Notice: Subject to any disclaimer, the term of this patent is extended or adjusted under 35 U.S.C. 154(b) by 1381 days.

(21) Appl. No.: 12/565,356

(22) Filed: Sep. 23, 2009

(65) Prior Publication Data

US 2010/0071488 A1    Mar. 25, 2010

Related U.S. Application Data

(60) Provisional application No. 61/194,074, filed on Sep. 24, 2008.

(30) Foreign Application Priority Data

Sep. 24, 2008    (DE) .......................... 10 2008 048 744

(51) Int. Cl.
B64D 11/00    (2006.01)
F16H 21/16    (2006.01)
B64D 11/06    (2006.01)

(52) U.S. Cl.
CPC ......... B64D 11/0696 (2013.01); Y10T 74/1884 (2015.01)

(58) Field of Classification Search
CPC .............. Y10S 280/10; Y10S 209/919; Y10S 474/901; Y10S 180/904; Y10S 224/924; B66F 9/12; B60R 22/06; B60R 5/047; B60R 22/04; B60R 22/26; B60R 2202/1818; B60R 21/2165; B60R 22/3405; B60R 17/02; B60R 2022/1825; B60R 2022/3424; B60R 2022/4816; B60R 2022/4866; B60R 22/03; B60R 22/205; B60R 22/206; B60R 22/34; B60R 22/4604; B60R 5/04; B60R 9/10; B60N 2/38; B60N 2/0825; B60N 2/24; B60N 2/42736; B60N 2/0232; B60N 2205/50; B60N 2/04; B60N 2/0732; B60N 2/0887; B61D 11/00; B61D 45/001; F16H 55/30; F16H 19/06; F16H 55/171; F16H 9/24
USPC .................. 74/89.21, 89.2; 244/118.5, 118.6, 244/122 R, 122 AH; 297/344.1; 248/503.1; 105/29.1

See application file for complete search history.

(56) References Cited

U.S. PATENT DOCUMENTS 2,967,468 A * 1/1961 Bretthauer .................... 396/294
2,978,125 A * 4/1961 Freeman ....................... 414/419
(Continued)

FOREIGN PATENT DOCUMENTS

DE    4310806 A1    10/1994
DE    10211437 A1    10/2003
(Continued)

Primary Examiner — William Kelleher
Assistant Examiner — Valentin Craciun
(74) Attorney, Agent, or Firm — Lerner, David, Littenberg, Krumholz & Mentlik, LLP

(57) ABSTRACT

A device for moving an object on a rail that has grid openings, the device having at least one first movement element, at least one first drive element, and at least one engagement element for engaging at least one grid opening. The engagement element is positioned on the first movement element. The first drive element for driving the first movement element is connected to the first movement element, and the first movement element is movably held in such a way that the engagement element is at least in some regions guided along an outside of the device. As a result of this an even force is directly introduced into the rail to prevent the object to be moved by sliding becoming skewed or jammed. Likewise, the device can be supplemented by a motor so moving the object can be carried out automatically, precisely, and quickly.

18 Claims, 5 Drawing Sheets

(56) References Cited

U.S. PATENT DOCUMENTS

Figure 1:
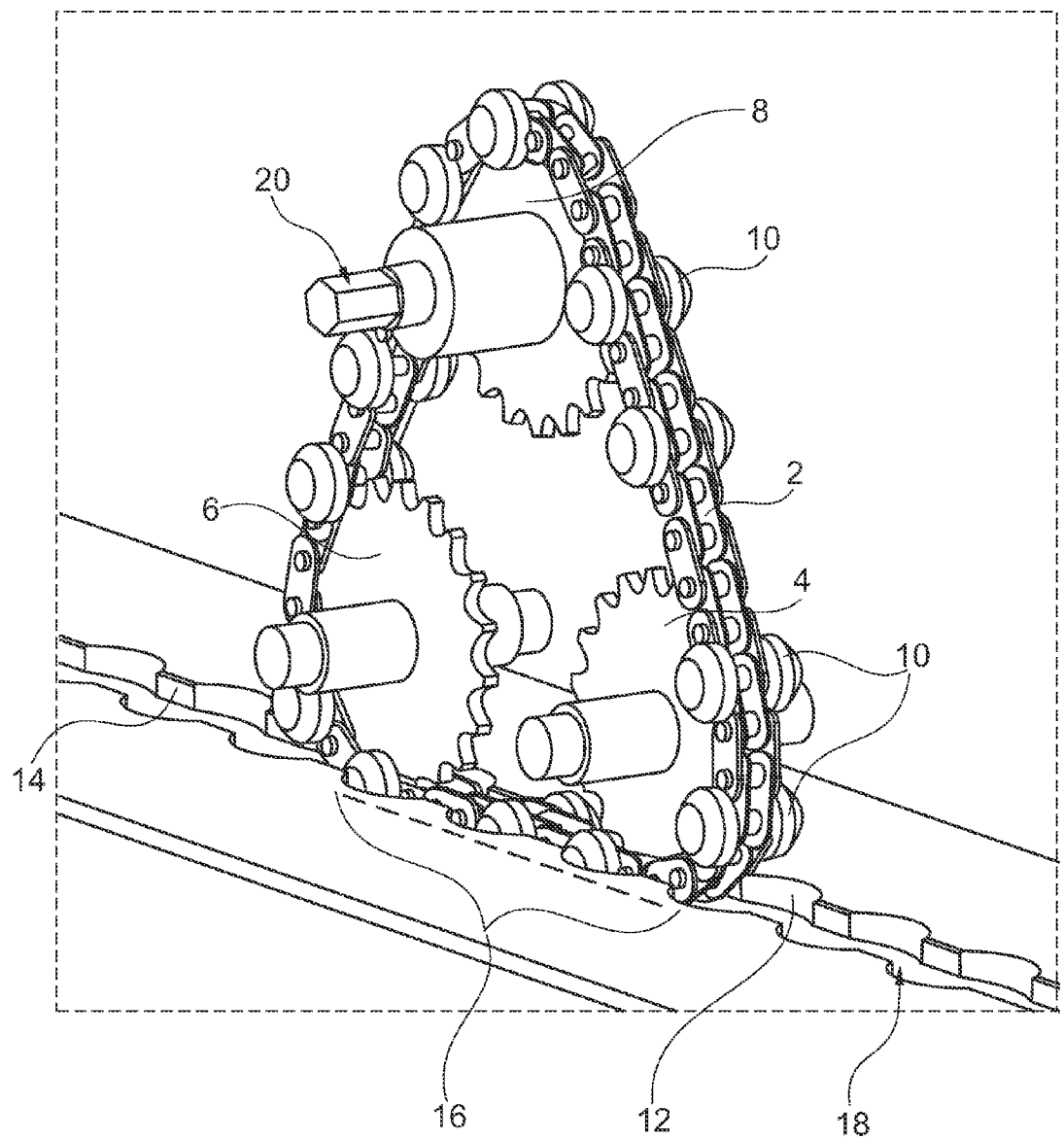

| | | | |
|---|---|---|---|
| 3,384,031 A * | 5/1968 | Dashew et al. | 104/138.1 |
| 3,824,871 A * | 7/1974 | Loesch et al. | 74/422 |
| 4,082,361 A * | 4/1978 | Lanfermann | 299/43 |
| 4,234,234 A * | 11/1980 | Sedlaczek et al. | 299/43 |
| 4,240,667 A * | 12/1980 | Sedlaczek et al. | 299/43 |
| 4,247,071 A * | 1/1981 | Carella et al. | 248/396 |
| 4,254,710 A * | 3/1981 | Guay | 104/165 |
| 4,753,119 A * | 6/1988 | Kuspert | 74/89.21 |
| 4,787,270 A * | 11/1988 | Suica | 74/665 M |
| 4,856,738 A * | 8/1989 | Martin | 244/122 R |
| 4,936,527 A * | 6/1990 | Gorges | 244/118.6 |
| 5,269,227 A * | 12/1993 | Warren et al. | 105/29.1 |
| 5,641,040 A * | 6/1997 | Grass | 187/201 |
| 6,182,791 B1 * | 2/2001 | Cope | 182/141 |
| 6,309,019 B1 | 10/2001 | Downey et al. | |
| 6,357,814 B1 * | 3/2002 | Boisset et al. | 296/65.03 |
| 7,207,756 B2 * | 4/2007 | Vichniakov et al. | 410/115 |
| 2005/0061914 A1 | 3/2005 | Bishop et al. | |
| 2006/0022085 A1 * | 2/2006 | Ferman | 244/45 R |
| 2007/0042848 A1 * | 2/2007 | Grabmann | 474/202 |
| 2007/0080566 A1 * | 4/2007 | Ferry et al. | 297/248 |
| 2007/0137971 A1 * | 6/2007 | Halsey | 192/82 T |
| 2008/0242462 A1 * | 10/2008 | Mitzschke et al. | 474/206 |
| 2010/0025530 A1 * | 2/2010 | Ferry et al. | 244/118.6 |

FOREIGN PATENT DOCUMENTS

| | | |
|---|---|---|
| DE | 102005047657 A1 | 4/2007 |
| DE | 102008006947 A1 | 8/2009 |
| EP | 0549082 A1 | 6/1993 |
| JP | 2-279433 A | 11/1990 |

\* cited by examiner

APPARATUS FOR MOVING AN OBJECT ON A RAIL

CROSS-REFERENCE TO RELATED APPLICATIONS

This application claims the benefit of the filing date of U.S. Provisional Patent Application No. 61/194,074 filed Sep. 24, 2008, the disclosure of which is hereby incorporated herein by reference.

The invention relates to an apparatus for moving an object on a rail. The invention further relates to a system for moving one or several objects on a rail, to the use of such an apparatus, and to a means of transport comprising at least one such device.

In modern means of transport, for example in commercial aircraft, it is common for passenger seats, passengers seat groups, and other objects to be attached in one or several rails, each of which comprises a predetermined grid with openings spaced apart from one another. These rails extend through the cabin of the aircraft at a predetermined spacing and allow very flexible attachment of objects, and in particular of passenger seats. Due to their primary use for the attachment of seats, such rails are also referred to as seat rails. For this purpose, the spacing of the grid could, for example, be 1 inch, so that passenger seats and other objects may be attached to the floor of the cabin at 1-inch spacing.

It is frequently desired for a cabin of an aircraft to be reconfigured in the shortest possible time, preferably within less than 30 minutes, so that the positions and spacing between individual passenger seats are changed and the cabin is given a different class division or the like. In the state of the art this requires undoing at the seat rail the individual locking devices of each passenger seat or of each passengers seat group, and sliding the corresponding passenger seats to a new location, which, however, is associated with a number of difficulties. For example, in a passenger aircraft cabin that is equipped in the usual way, for each passenger seat group four individual locking devices have to be manually undone; a process which requires the corresponding person to kneel on the floor and to move levers, toggles, locking devices, bolts or the like under the seat group.

There is a further difficulty in that passenger seat groups are usually interconnected by cables so that data from an in-flight entertainment (IFE) system or some other systems may be transmitted to display screens, headphone jacks or the like, and so that switching elements on the passenger seats, which switching elements are connected by way of a data network, may communicate with a central processing unit. Due to the existing space for accommodating unused lengths of cable, the lengths of the cables that to this effect extend from one passenger seat group to another, are limited. Consequently it is not possible to slide the front seat group from its original position to an end point that is situated relatively far from the remaining passenger seat groups. Accordingly, all the passenger seat groups within a certain framework should be moved by sliding together to a new region in the cabin, so that so-called seat-to-seat cabling does not suffer and does not have to be disconnected prior to sliding. As an alternative to this, seat-to-seat cabling could be disconnected, which would be relatively involved, in order to slide passenger seat groups across relatively large distances.

Furthermore, there are further difficulties in that sliding a passenger seat group is not particularly easy, because a single person may basically forcefully hold and slide a passenger seat group only at a relatively narrow region, so that there is a danger of the passenger seat group rotating relative to the seat rails, and to subsequently jam.

From DE 102008006947 and U.S. 61/063,048 a system for the simultaneous longitudinal sliding of several selected seats or seat rows in an aircraft is known, in which system a drive device is provided that is preferably arranged outside the seats to be moved by sliding. The drive device comprises a mechanically simple design and preferably engages the corresponding counterparts on the seats by means of eyelets or hooks when the drive device is pulled past them. However, equipping the entire cabin of an aircraft with such a drive device is relatively involved. This system does not without further ado allow fast, simultaneous individual sliding of seats.

For these reasons, with the presently common design of the cabin of an aircraft it is unlikely to be possible, or possible only with the use of considerable human resources, for reconfiguration of the cabin to complete sliding of the passenger seat groups or seat rows within less than 30 minutes.

It may therefore be an object of the invention to create an apparatus that makes possible the most convenient possible sliding of seat rows or objects generally on one or several rails, without this resulting in said seat rows or objects becoming skewed or jammed. It may also be a further object of the invention to propose such an apparatus in which there is no need for seat-to-seat cabling to be disconnected. In particular, the apparatus to be proposed may be to make it possible to achieve as complete a reconfiguration as possible of a cabin of an aircraft within a period of less than 30 minutes.

This object may be met by an apparatus for moving an object on a rail, according to the characteristics of the independent claim 1.

It is an important aspect of the present invention for the apparatus to comprise engagement elements on a first movement means, driven by a first drive element, which engagement means are designed to engage indentations or openings in the grid arrangement of the rail, and on these indentations or openings in the grid arrangement to exert a force for sliding the object. The apparatus is thus to be affixed on the object to be moved by sliding, and the engagement elements are to be moved relative to the apparatus, as a result of which the object is made to move. Since the engagement elements introduce a sliding force directly at the seat rail, it becomes possible to minimise the danger of causing skewing of a seat locking device or the like in the seat rail as a result of geometrically unfavourable force introduction. The apparatus is preferably designed such that it essentially comprises a flat and slidable underside that may be easily moved along the seat rail when the seat locking device is undone and the locking device bodies or the like slide in the seat rail and in this process guide the seat that is to be moved by sliding so that it moves along the seat rail.

At this point reference is made to the design of conventional seat rails that comprise a central slit that extends in the direction of extension, which slit comprises essentially circular openings regularly spaced apart from each other. The spacing is usually 1 inch so that the objects to be attached in the cabin of an aircraft may be locked into position in a 1-inch grid. The seat spacing or seat pitch is commonly selected to range from 30 to 39 inches, wherein a shorter pitch is used for seats on more economical flights, while a greater pitch tends to be found in business class or first class. It is thus possible, for example, during reconfiguration of the cabin to change the seat pitch depending on the number of sold tickets in a given class.

In a particularly preferred improvement of the apparatus according to the present invention, the engagement elements are arranged on a first line-shaped movement element and are distributed in a regular manner along the first movement element, which regular manner supports safe and reliable engagement of the engagement elements in the openings of the grid arrangement of the seat rail, which openings are spaced apart regularly. As a first linear movement element, a chain driven by a chain wheel, a belt or the like could be used, on which several engagement elements may be arranged, with said movement element essentially comprising an enclosed circumference. In this way the first linear movement element may carry out a continuous movement that results in a continuous movement of engagement elements that engage the openings in the seat rail, and, after a limited travelling path, leave said openings in a region of the apparatus, which region faces the seat rail.

In contrast to this, suitable engagement elements for conventional seat rails in passenger aircraft may be roller-like bodies that are partly cylindrical and that comprise rounded edges, which bodies at an edge of an opening may conform to the seat rail. The first movement element is to be guided along the apparatus in such a way that it projects into the slit of the seat rail, and so that the engagement elements may conform to opening edges. Preferably more than half the design height of the engagement elements projects into the openings, since otherwise there is a danger of them sliding out of the engagement position. If more than half the design height of said engagement elements projects into the seat rail, the opening edges generate a force that acts towards the centre of the engagement elements, which force supports the position of the engagement elements. As a supplementary safeguard of the first linear movement element for continuous movement, a guide may be arranged on both sides, which guide is arranged parallel to the seat rail. The slit-depth delimitation of the central slit of the seat rail could be used as a guide for the lower delimitation.

Particularly preferably, on two sides of the object to be moved, there is such an arrangement each as mentioned above as a result of which the components of the first and of the second side are denominated accordingly. Thus according to a preferred improvement of the apparatus according to the present invention, on each side of the object to be moved by sliding there are first movement elements and second movement elements, and first and second drive elements, because larger objects in the cabin of an aircraft are usually attached to two seat rails so that along these two seat rails too the object has to be moved by sliding. To ensure that sliding takes place continuously and evenly on both sides, it is preferred to couple the movement of the second drive element with the movement of the first drive element. To this effect the exemplary use of a first shaft between two drive wheels, be they chain wheels or pulleys, would suggest itself.

If a first shaft is used to transmit the movement between the two movement elements, an outer protective tube that encloses the first shaft may be provided, which protective tube extends below the object to be moved by sliding. For example, the protective tube could be arranged below the front edge of a passenger seat group so that in that location it could assume the function of a baggage bar, which prevents baggage stored underneath the seats from sliding forwards in flight or during landing.

Furthermore, a preferred improvement of the apparatus according to the present invention comprises a first pivotably held locking lever that may be used to operate one or several locking apparatuses. It is particularly preferred if the apparatus also comprises a second locking lever, which corresponds to the first locking lever, with the movements of the locking levers being able to be coupled by means of a second shaft, wherein this second shaft could be designed as a hollow shaft. Such a hollow shaft could enclose the first shaft, which couples the movements of the two drive elements or vice versa. Furthermore, it is favourable anyway to design all the shafts used as hollow shafts because at a lower weight when compared to solid shafts said hollow shafts may comprise equal strength. These two shafts may also be arranged concentrically and may be enclosed by a shared protective tube so that a space-saving design for coupling the individual elements is provided.

Furthermore, it is particularly favourable if the apparatus according to the present invention comprises a drive device that may be used to drive the first and the second drive elements. This makes it possible to slide the objects in a very easily in that by pressing a button the drive device causes the movement element to move and consequently the object is moved along the rails.

In this context it is imaginable if the drive device is designed as a servomotor that provides very high positioning accuracy, thus making it possible to correctly position the objects on the seat rails. In order to improve precision, and in order to reduce the size of the drive device, a step-down gear may be used that could in a space-saving manner be coupled to the housing of a servomotor.

In addition it would also be very advantageous to provide for a control device that could control one or several servomotors on the objects to be moved by sliding. It would be imaginable to provide a large number of objects installed in the cabin of an aircraft with such an improvement of the apparatus according to the present invention so that by way of corresponding programming a region of a cabin could be completely reconfigured by the activation of a button from a flight attendant panel. To this effect a corresponding drive device for undoing locking apparatuses would have to be activated so that, in the cabin, all the objects to be moved by sliding may be slidably detached from the seat rail. Thereafter the corresponding servomotors or the like of the apparatuses according to the present invention on the individual objects would have to be controlled so that all the objects, for example passenger seat groups, are automatically moved to their newly allocated positions where they may again be locked into position by a locking apparatus. To take account of the limited lengths of the seat-to-seat cables it would be imaginable to mutually adjust the respective travel paths of the objects so that the travelling speeds of passenger seat groups that are located one behind the other are variably adjusted to the existing cable length.

Lastly, the object is also met by the use of an apparatus according to the present invention for sliding an object. Likewise, the object is also met by a means of transport and in particular an aircraft comprising at least one object, at least one rail, and at least one apparatus according to the present invention for sliding the object.

Figure 2:
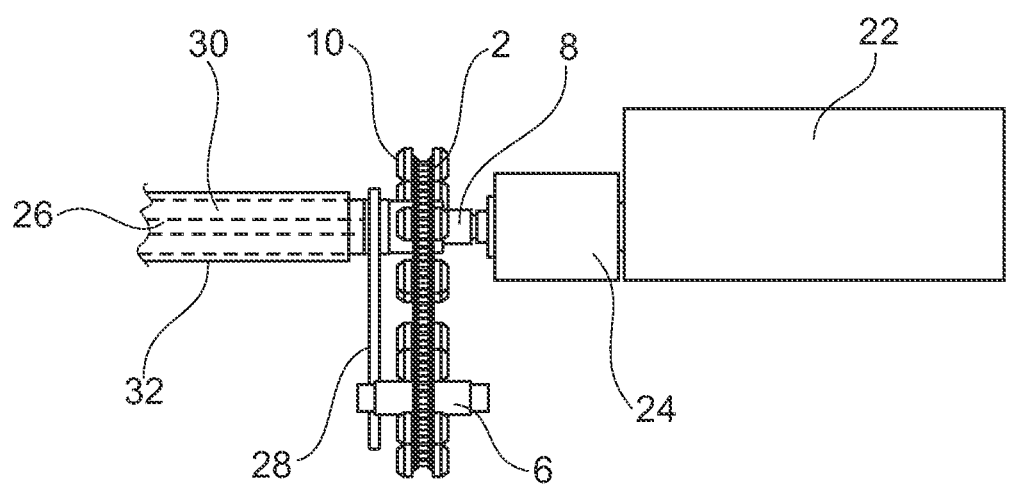
Figure 3A:
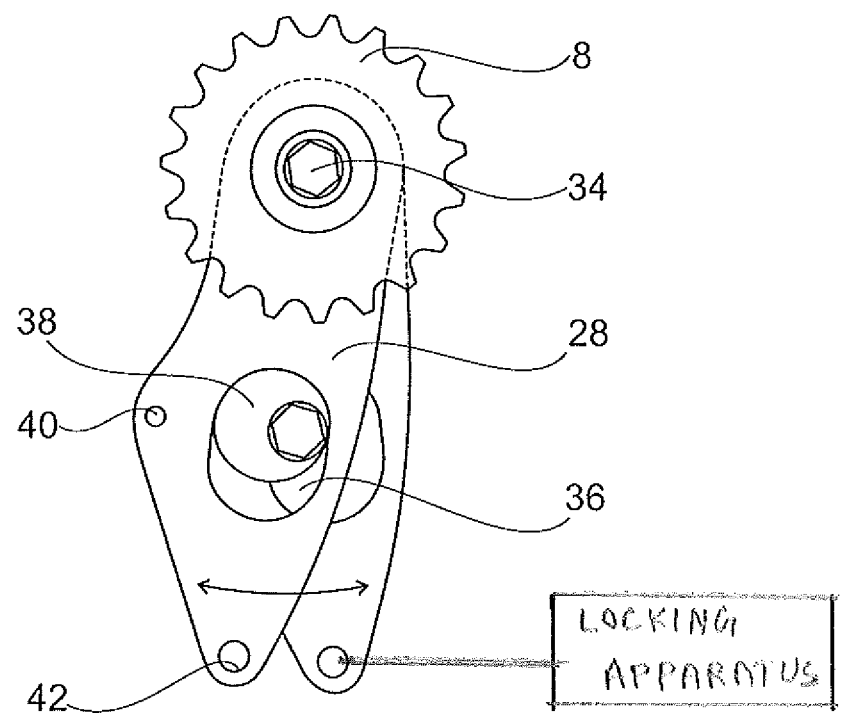
Figure 4:
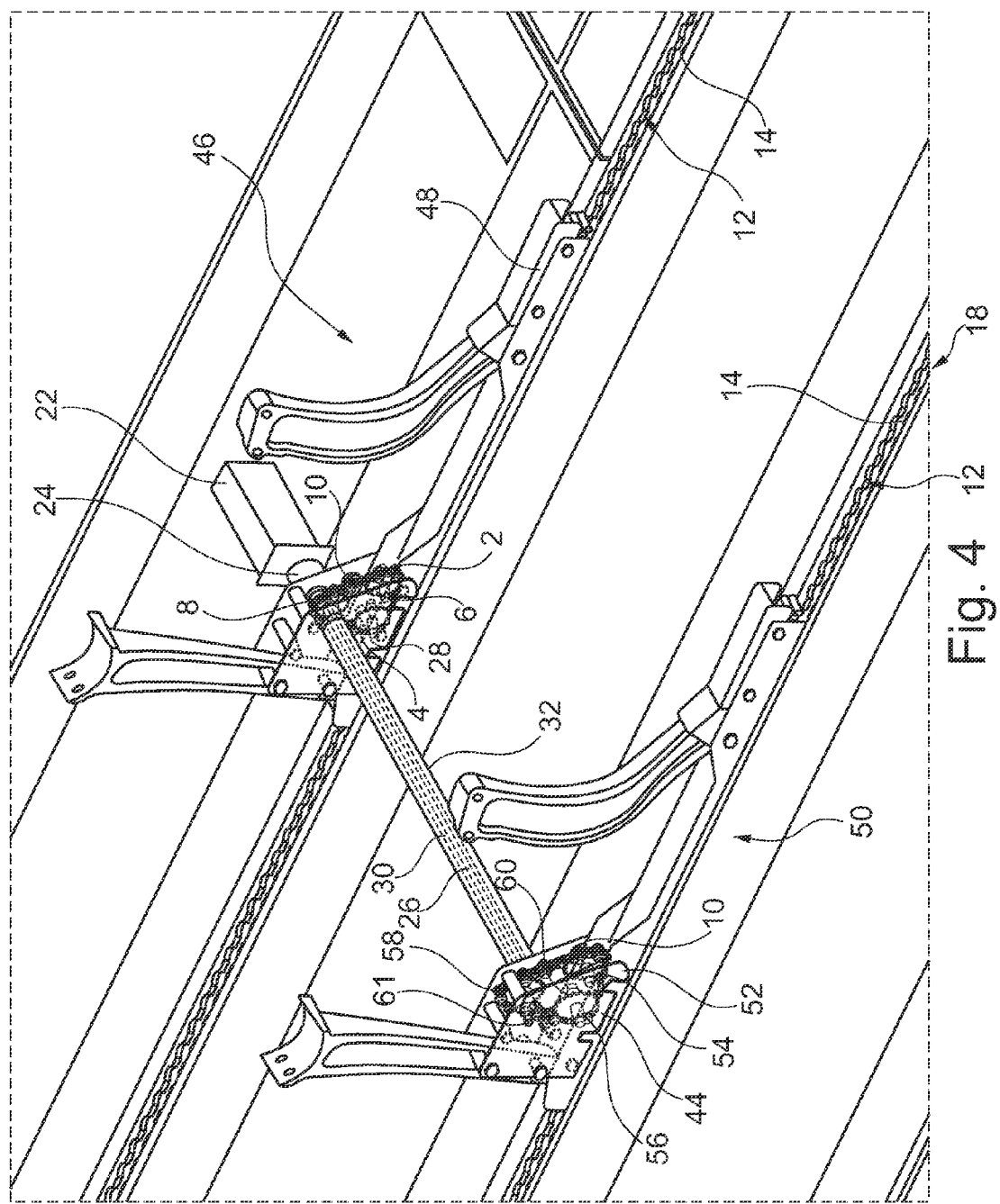
Figure 5:
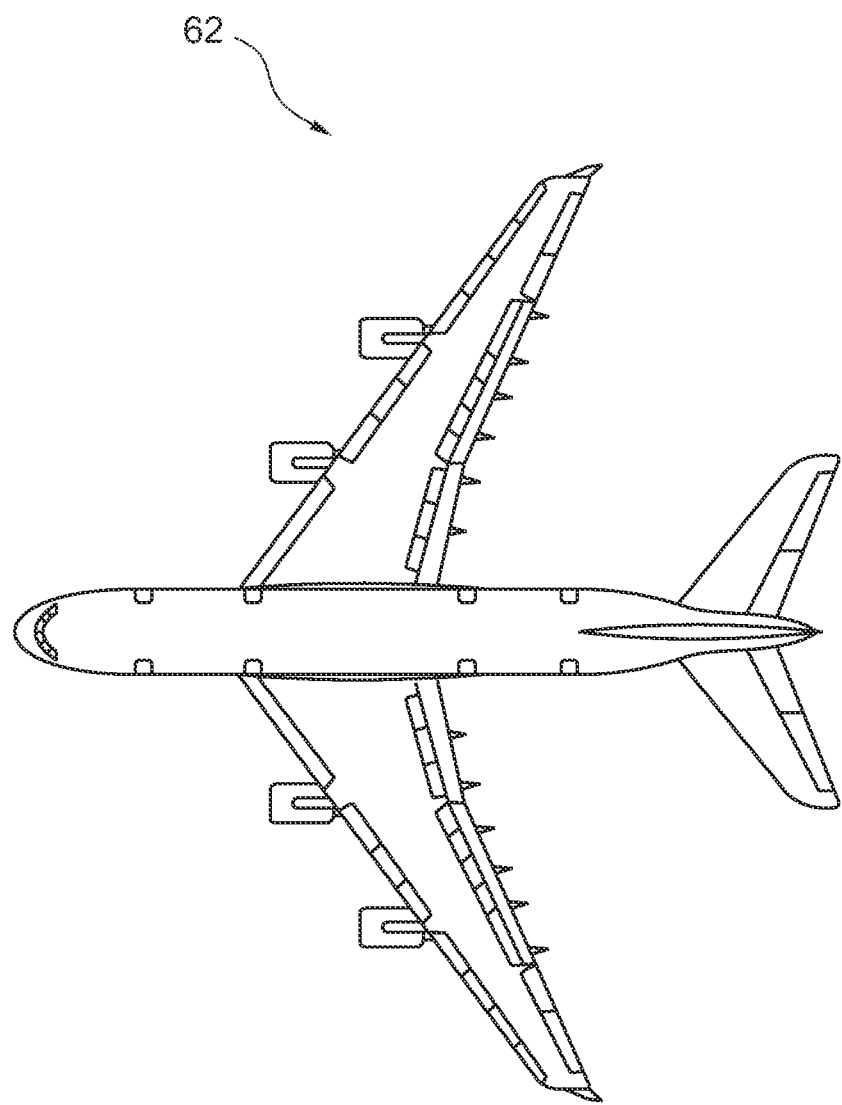

Further characteristics, advantages and application options of the present invention are disclosed in the following description of the exemplary embodiments and of the figures. All the described and/or illustrated characteristics per se and in any combination form the subject of the present invention, also irrespective of their composition in individual claims or their interrelationships. Furthermore, identical or similar components in the figures have the same reference characters. The following are shown:

FIG. 1: a three-dimensional view of a first exemplary embodiment of the movement element, of the engagement elements, of the chain wheels and of the rail;

FIG. 2: a lateral view of a partial region of the device according to the present invention;

FIGS. 3a+b: detailed views of a pivotable lever of an exemplary embodiment of the device according to the present invention;

FIG. 4: an overview of the entire device according to the present invention; and FIG. 5: an aircraft comprising at least one device according to the present invention.

FIG. 1 shows a first movement element 2 in the form of a chain that comprises a closed circumference, with three chain wheels 4, 6 and 8 engaging the interior space of said chain. In the first movement element 2 roller-like engagement elements 10 are integrated, whose outer edges are designed such that they essentially conform in a positive-locking manner to edges of grid openings 12 of a rail 14. To this effect the first movement element 2 has to extend at least along a region 16 in a slit 18 of the rail 14 so that at least half of each engagement element extends in the seat rail 14.

In order to ensure the force transmission of engagement elements 10 to the rail 14 it is particularly advantageous if in each case two adjacent engagement elements 10 are spaced apart from each other so that positioning of the two adjacent engagement elements 10 on two facing edges of adjacent grid openings 12 of the rail 14 is possible. Accordingly, in each case individual pairs of engagement elements 10 are shown along the first movement element 2, wherein the distance between the pairs is larger than the distance of the engagement elements 10 of each pair. This results in the alternating distances, shown in FIG. 1, between the engagement elements, as a result of which distances a pair of engagement elements 10 is always fully positioned within grid openings 12. In this way in each position of the first movement element 2 reliable movement introduction in each of the two possible directions may be implemented.

In the illustration shown, the chain wheel 8 is spaced apart further from the seat rail 14 than are the chain wheels 4 and 6 and is predominantly used to introduce movement of the first movement element 2 by way of a corresponding connecting region 20, in this way implementing the first drive element. By way of a commonly used shaft-hub connection, which may have positive fit, may be integral, or may have non-positive fit, a motor, a crank, a bit of a screwdriver or the like may be connected at the connecting region 20 of the upper chain wheel 8. As a result of the exposed position of the top chain wheel 8, a corresponding device that is arranged thereon may be constructed so as to be relatively large, without the device to be arranged colliding with the seat rail 14.

It should be pointed out that the invention is in no way limited to the use of a chain with three chain wheels 4, 6 and 8. Instead it would also be possible to use different first movement elements 2 and different first drive elements. If a chain is used, it would also be possible to use only two chain wheels, which then for the purpose of maintaining a safety distance between a drive device and the seat rail would have to have a corresponding diameter.

FIG. 2 shows a lateral view of a first movement element 2 with engagement elements 10, wherein the top chain wheel 8 is driven by a motor 22. The motor 22 could preferably be designed as a pulse-controlled servomotor which makes possible very precise positioning of the engagement elements 10 at the grid openings 12 of the rail 14. Rotation of the motor 22 may be introduced to the chain wheel 8 by way of a gear arrangement 24, wherein the gear arrangement 24 could, for example, be designed as a space-saving planetary gear with a housing size that corresponds to that of the housing of the motor 22.

Rotary movement of the chain wheel 8 may be transmitted by a first shaft 26 to a further chain wheel (not shown in the diagram). To this effect the first shaft 26 between the chain wheel 8 and the opposite chain wheel is provided. Likewise, a first locking lever 28 may be affixed to the apparatus according to the present invention, wherein the pivoting movement of said locking lever, by way of a second shaft 30 that preferably encloses the first shaft 26 and is designed as a hollow shaft, may also be transmitted, to a further, second, locking lever, situated opposite (also not shown in FIG. 2). Finally, in the exemplary illustration the arrangement comprising the first shaft 26 and the second shaft is enclosed by a protective tube 32 that prevents the function of the first shaft 26 or the second shaft 30 from being impeded.

If the apparatus according to the present invention, for sliding a seat or a seat group along seat rails 14, is used, the apparatus may be arranged in such a way that the protective tube 32 is positioned underneath the front of the seat or seats, thus assuming the function of a baggage bar. Any baggage stowed underneath the seat is thus prevented from sliding underneath a seat in front. The apparatus according to the present invention is correspondingly multifunctional, and the weight of a baggage bar that otherwise would be necessary in addition may be saved.

FIG. 3a shows the first locking lever 28 in somewhat more detail. The first locking lever 28 is pivotably held at an upper pivoting point 34 and preferably comprises an elongated hole 36 that by means of a cam 38 makes it possible for the first locking lever 28 to pivot on the pivoting point 34. The arrangement comprising a cam 38 and an elongated hole results in two opposite movement dead centres which may, for example, be used for a lock-down position and an unlocked position of a corresponding locking apparatus. The two opposite movement dead centres are preferably exceeded sufficiently far until safe dead centre locking is achieved. Such locking apparatuses (not shown in FIG. 3a) may correspondingly be activated through openings 40 and 42 by means of rod assemblies or the like.

A rod assembly may, for example, comprise a rod and a fork head on each side of the rod. A fork head may be held in an opening 40 or 42 of the locking lever, while the opposite fork head may be held to a corresponding locking apparatus. In order to enforce adequate holding force, it is imaginable to displaceably hold one of the two fork heads axially in the direction of extension of the rod, and, by means of a pressure spring, to push it into an end position which is, for example, determined by means of a bolt screwed through the fork head and into the rod. The holding force further ensures that no vertical play arises in the locking mechanism so that vibration-induced rattling is avoided.

Figure 3B:
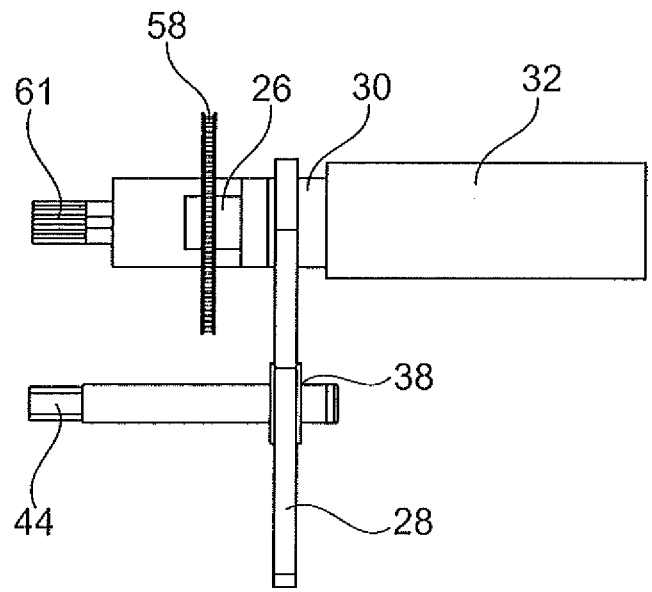

FIG. 3b shows that the pivoting movement of the first locking lever 28 may be initiated by an additional auxiliary locking shaft 44 by way of a drive device (not shown in detail) that rotates the cam 38 within the elongated hole 36. Here again a crank, a bit of a screwdriver or the like could be considered as a drive device which, in a manner similar to the above-described connecting region 20 of the top chain wheel 8, could be connected by way of a commonly used shaft-hub connection, which may have positive fit, be integral, or have non-positive fit. Accordingly in the apparatus according to the present invention, a sliding function for sliding an object along the rail could be separate of a lock-down function for locking down the object to the rail.

FIG. 4 shows an overview of the apparatus according to the present invention. The first movement element 2 with the three chain wheels 4, 6 and 8 as well as the engagement elements 10 is located on one side 46 of a seat frame 48. On the other side 50 of the seat frame 48 a similar arrangement is positioned, which comprises a second movement element 52, chain wheels 54, 56 and 58 as well as engagement elements 10. The top chain wheel 58 at the side 50 acts as a second drive element and is connected, by way of the first shaft 26 that is enclosed by a protective tube 32, to the first drive element in the form of the chain wheel 8. The engagement elements 10 on the first movement element 2 and on the second movement element 52 engage the grid openings 12 of two rails 14 in a floor, and in the case of rotating first and second drive elements in the form of the chain wheels 8 and 58 may cause movement of the seat frame 48 along the rails 14. Within the protective tube 32 there is furthermore also a second shaft 30, by means of which the movement of the first locking lever 28 on the side 46 of the seat frame is transmitted to a second locking lever 60 on the side 50 of the seat frame 48.

As is also clearly shown in FIG. 4, the auxiliary locking shaft 44 may be arranged on the side 50 of the seat frame 48, in a manner that differs from that of the motor 22. In addition to this, a second chain wheel 58 may comprise a connecting region 61 that is designed in a way that is similar to the connecting region 20 of the chain wheel 8 and is used for manually operating the device with the motor 22 being connected. This could be sensible above all if maintenance work is required or for emergency operation in the case of a defective base drive comprising the motor 22 and the gear arrangement 24.

Lastly, FIG. 5 shows an aircraft 62 in which at least one object may be moved by sliding on at least one rail that comprises grid openings, by means of at least one apparatus according to the present invention.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

LIST OF REFERENCE CHARACTERS

2 First movement element
4 Chain wheel
6 Chain wheel
8 Chain wheel
10 Engagement element
12 Grid opening
14 Seat rail/rail
16 Region of the rail
18 Slit
20 Connecting region of the chain wheel 8
22 Motor
24 Gear arrangement
26 First shaft
28 Locking lever
30 Hollow shaft
32 Protective tube
34 Pivoting point
36 Elongated hole
38 Cam
40 Opening
42 Opening
44 Auxiliary locking shaft
46 Side of a seat frame
48 Seat frame
50 Side of a seat frame
52 Second movement element
54 Chain wheel
56 Chain wheel
58 Chain wheel
60 Second locking lever
61 Connecting region of the chain wheel 58
62 Aircraft

The invention claimed is:

1. An apparatus for moving an object on a rail comprising a plurality of grid openings, comprising:
   a first movement element comprising a longitudinal element having a first and a second lateral walls;
   a first drive element; and
   an engagement element for engaging at least one of the plurality of grid openings, the engagement element comprising a plurality of sets, each set comprising a first pair and a second pair, each pair comprising a first and a second cylindrical bodies extending laterally from the first and the second lateral walls, respectively, wherein a first distance between a first pair of a first set and a second pair of a second set is greater than a second distance between the first and second pairs of the first set;
   wherein the first drive element is connected to the first movement element for driving the first movement element, and
   wherein the first movement element is movably held in such a way that the engagement element is at least in some regions guided along edges of the grid openings.

2. The apparatus of claim 1, wherein the first movement element is configured as an essentially linear movement element.

3. The apparatus of claim 2, wherein the first movement element is a closed chain held so as to be movable in circumferential direction.

4. The apparatus of claim 1, wherein the engagement element is configured as a roller-like body.

5. The apparatus of claim 3, wherein the first drive element is a chain wheel.

6. The apparatus of claim 1, further comprising a second movement element and a second drive element, wherein the second drive element is coupled to the first drive element by a first shaft.

7. The apparatus of claim 6, further comprising a protective tube enclosing the first shaft.

8. The apparatus of claim 7, further comprising a first pivotably held locking lever for operating one or several locking apparatuses.

9. The apparatus of claim 8, further comprising a second pivotably held locking lever for operating the one or several locking apparatuses, wherein the second locking lever by way of a second shaft is coupled to the first locking lever in such a way that pivoting of the first locking lever causes corresponding pivoting of the second locking lever.

10. The apparatus of claim 9, wherein the first shaft or the second shaft is configured as a hollow shaft, and wherein the first shaft, the second shaft and the protective tube are concentrically arranged.

11. The apparatus of claim 10, wherein the first shaft and second shaft are configured as hollow shafts.

12. The apparatus of claim 6, wherein said second movement element is at least one second movement element and said second drive element is at least one second drive element.

13. The apparatus of claim 1, further comprising a drive device for driving the first drive element.

14. The apparatus of claim 13, wherein the drive device is a motor.

15. The apparatus of claim 13, wherein for initiating movement of the objects along the rail the drive device is connected to a regulating unit.

16. The apparatus of claim 1, wherein the first movement element is at least one first movement element, the first drive element is at least one first drive element, and the engagement element is at least one engagement element.

17. A transportation device with at least one rail comprising a plurality of grid openings, at least one object configured to be locked to the rail, and at least one apparatus for moving the object on the rail, the at least one apparatus comprising:

a first movement element comprising a longitudinal element having a first and a second lateral walls;

a first drive element; and an engagement element for engaging at least one of the plurality of grid openings, the engagement element comprising a plurality of sets, each set comprising a first pair and a second pair, each pair comprising a first and a second cylindrical bodies extending laterally from the first and the second lateral walls, respectively, wherein a first distance between a first pair of a first set and a second pair of a second set is greater than a second distance between the first and second pairs of the first set;

wherein the first drive element is connected to the first movement element for driving the first movement element.

18. An apparatus for moving an object on a rail comprising a plurality of grid openings, comprising:

a first movement element comprising a longitudinal element having a first and a second lateral walls;

a first drive element; and an engagement element for engaging at least one of the plurality of grid openings, the engagement element comprising a first and a second cylindrical bodies extending laterally from the first and the second lateral walls, respectively, and a connecting member extending between the first and second lateral walls, wherein a first diameter of the first cylindrical body is greater than a second diameter of the connecting member;

wherein the first drive element is connected to the first movement element for driving the first movement element, and wherein the first movement element is movably held in such a way that the first and second cylindrical bodies are at least in some regions guided along edges of the grid openings in a positive-locking manner in a longitudinal direction of the plurality of grid openings and in a direction transverse to the longitudinal direction.

* * * * *